United States Patent [19]

Morimoto

[11] 4,165,905
[45] Aug. 28, 1979

[54] VEHICLE DECELERATION RESPONSIVE PRESSURE MODULATING VALVE AND VEHICLE BRAKE SYSTEM INCLUDING THE SAME

[75] Inventor: Yoshiro Morimoto, Yokohama, Japan

[73] Assignee: Nissan Motor Company, Limited, Yokohama, Japan

[21] Appl. No.: 792,005

[22] Filed: Apr. 28, 1977

[30] Foreign Application Priority Data

Apr. 30, 1976 [JP] Japan .................. 51-49430

[51] Int. Cl.² .............................. B60T 8/14
[52] U.S. Cl. ................... 303/24 F; 303/24 C
[58] Field of Search .......... 137/38; 188/195, 349; 303/6 C, 22 R, 24 R, 24 A, 24 C, 24 F

[56] References Cited

U.S. PATENT DOCUMENTS

| 3,087,761 | 4/1963 | Stelzer | 303/6 C X |
| 3,163,473 | 12/1964 | Stelzer | 303/6 C |
| 3,252,740 | 5/1966 | Stelzer | 303/6 C |
| 3,317,251 | 5/1967 | Hambling et al. | 303/24 A |
| 3,377,108 | 4/1968 | Eddy | 303/24 C |
| 3,975,062 | 8/1976 | Giordano et al. | 303/24 C X |

FOREIGN PATENT DOCUMENTS

| 2119941 | 12/1971 | Fed. Rep. of Germany | 303/24 C |
| 1321921 | 7/1973 | United Kingdom | 303/24 A |

*Primary Examiner*—Stephen G. Kunin

[57] ABSTRACT

A vehicle braking system includes a pressure modulating valve interposed in the pressure fluid line between a master cylinder and the rear wheel brake cylinders. The pressure modulating valve comprises a valve seat fluidly disposed in a valve body intermediate an inlet port of the valve body and an outlet port thereof, an inertia ball capable of seating against the valve seat, and apparatus for increasing the magnitude of the vehicle deceleration at which the inertia ball seats against the valve seat in response to an increase of master cylinder pressure.

10 Claims, 6 Drawing Figures

VEHICLE DECELERATION RESPONSIVE PRESSURE MODULATING VALVE AND VEHICLE BRAKE SYSTEM INCLUDING THE SAME

BACKGROUND OF THE INVENTION

It is known in the art to provide a pressure modulating valve in the pressure fluid line of a vehicle brake system between a master cylinder and at least one of the rear wheel brake cylinders.

A pressure modulating valve interposed in a brake system functions to compensate for difference in the effectiveness of the front and rear brakes. The differences in effectiveness is due to the dynamic weight shift to the front axle during a brake application. It is the weight shift which produces the principle need for a pressure modulating valve.

The imbalance between the effectiveness of the front and rear brakes is particularly apparent in a truck and varies substantially depending upon the amount of load which the truck carries. In a fully loaded truck, the weight on the rear axle may be such that the rear brakes have braking capability that is almost as great as that of the front wheels. When the same truck is in an unladen condition, however, its rear brakes will not be nearly as effective as the front brakes. In such an unladen truck, equal pressure at the front and rear brakes would produce rear wheel skid when the master cylinder pressure is high enough to produce a moderate rate of vehicle deceleration.

In a truck, where the relative effectiveness of the front and rear brakes changes greatly depending upon the load on the vehicle, it is desirable to have a modulating valve with a changeover point that may be modulated or regulated in response to the amount of load and the effectiveness of the brakes.

A known modulating valve embodying the desired effect employs an inertia ball which, when the vehicle deceleration reaches a fixed value, rolls up an inclined ramp to seat against a valve seat, isolating the rear brake cylinders, and any further increase in master cylinder pressure after changeover point or pressure is prevented from being transmitted to the rear brake cylinders or is transmitted to some extent to the rear brake cylinders. The inertia ball can modulate the changeover pressure in response to the amount of load carried by the vehicle because assuming that the vehicle is heavity loaded, the required magnitude of deceleration at which the inertia ball seats against the valve seat will be achieved when a relatively high master cylinder pressure exists. However, the fact that the required magnitude of deceleration at which the inertia ball seats against the valve seat is fixed causes a problem that if, in designing a brake system, the required magnitude at which the inertia ball seats against the valve seat is so adjusted as to provide the braking ratio approaching the ideal braking ratio when the vehicle is unladen, the changeover pressure which will be obtained when the same vehicle is fully laden will be so low that the braking ratio obtained deviates considerably from the ideal braking ratio when the vehicle is fully laden, thereby increasing the stopping distance during braking operation under this condition.

SUMMARY OF THE INVENTION

It is therefore an object of the present invention to provide a pressure modulating valve for a vehicle braking system which provides a more precise control of a changeover pressure in response to the load carried by the vehicle.

It is another object of the present invention to provide a pressure modulating valve which is not only suitable for use in a braking system for a passenger car, but also suitable for use in a braking system for a truck which carries a relatively large amount of load when it is fully laden as compared to the passenger car.

It is still another object of the present invention to provide a pressure modulating valve in which the required magnitude of deceleration at which the inertia ball seats against the valve seat increases in response to an increase in master cylinder pressure fed to the valve.

BRIEF DESCRIPTION OF THE DRAWINGS

The invention will be further described hereinafter in connection with the accompanying drawings, in which.

DETAILED DESCRIPTION OF THE PREFERRED EMBODIMENTS

Figure 3:
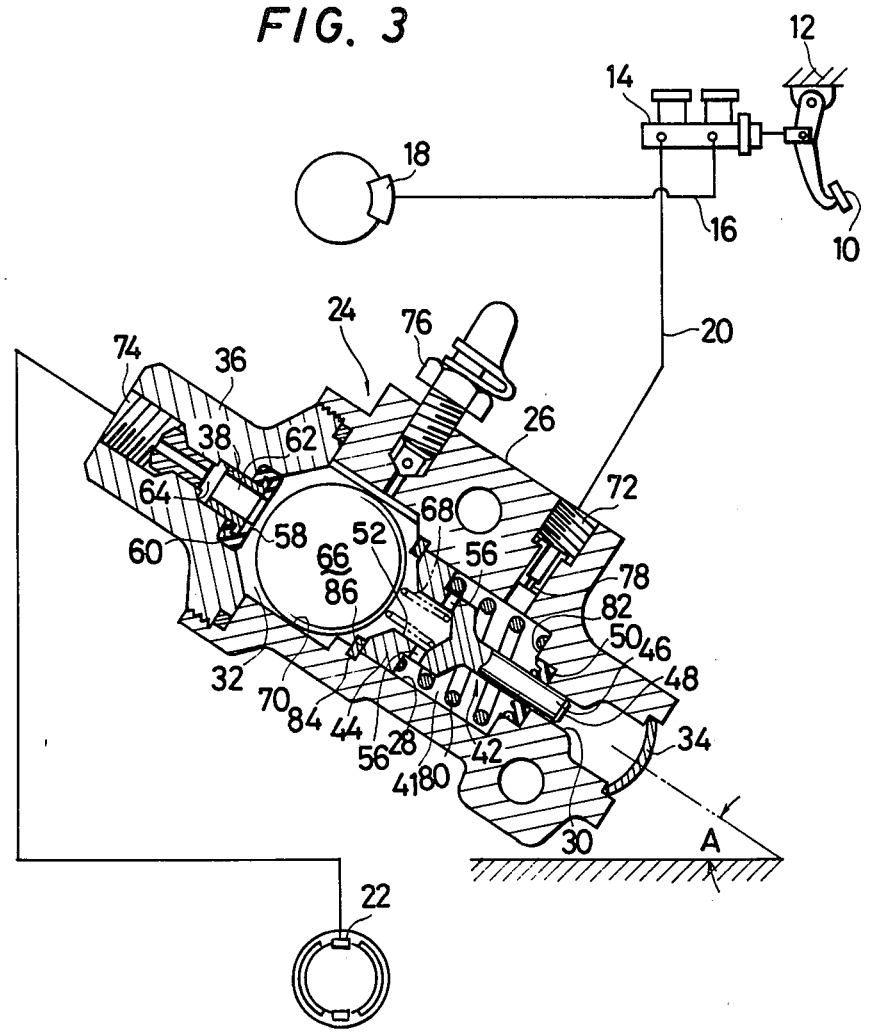
FIG. 3 is a schematic view of a vehicle brake system including a first embodiment of a modulating valve shown in section, the modulating valve being of the type which prevents transmission of any further increase in master cylinder pressure after a changeover pressure to the rear brake cylinders.

Referring to FIG. 3 of the accompanying drawings, a vehicle braking system in which a pressure modulating valve embodying the invention is illustrated as installed includes a brake pedal 10 suspended from a portion of the vehicle (not shown) 12 to operate a master cylinder 14. The master cylinder 14 is of the dual piston and pressurizing chamber type in which the front fluid pressure line 16 is pressurized by one piston to actuate the front brakes, only one being shown at 18, and the rear fluid pressure line 20 is pressurized by another piston to actuate the rear brakes, only one being shown at 22. The modulating valve 24 is interposed in the rear fluid pressure line 20 intermediate the master cylinder 4 and the rear brakes 22, and suitably mounted on the vehicle at a predetermined angle A from the horizontal plane of the vehicle.

The modulating valve 24 has a valve body 26 provided with a large diameter bore 28, a small diameter bore 30 connected to one end of the bore 28, and an end chamber 32 connected to the opposite end of the bore 28. The valve body 26 is closed at its ends by a dust cover 34 and a headnut 36, the dust cover closing an open end of the bore 30 and the headnut 36 closing the end chamber 32. The headnut 36 may be considered to be a part of the valve body 26 and is provided with a second small diameter bore 38 which passes through the headnut and connected to the end chamber 32. The center section of the large diameter bore 28 provides an inlet pressure chamber 41.

A control piston 42 is mounted for slidable axial movement in the large diameter bore 28 and has a piston section 44 and an integral piston rod section 46. The piston rod section 46 extends into the first small diameter bore 30 so that its end 48 is exposed to atmospheric pressure at the outer end of the small diameter bore 30. A seal 50 seals the piston rod section 46 and the valve body 26 so that the pressure is retained within the inlet pressure chamber 41. The piston section 44 is formed with a blind bore 52 opening to the end chamber 32. The inlet pressure chamber 41 is connected to the end chamber 32 by a plurality of cross passages 56 extending through the control piston 42.

An annular valve seat 58 is mounted on a shoulder 60 separating the end chamber 32 from the second small diameter bore 38. A passage 62 connects the end chamber 32 with an outlet pressure chamber 64 through the center of the annular valve seat 58. An inertia ball 66 received in the end chamber 32 is provided which is capable of seating against the valve seat 58 to close the passage 62. Since the body 26 is normally mounted at the angle A to the horizontal plane of the vehicle and pointing upwardly and forwardly of the vehicle, the ball 66 normally rests against a control spring 68, in spaced relation to the valve seat 58. The side wall 70 of the end chamber 32 therefore becomes a ramp along which the ball 66 can move, under the influence of vehicle deceleration until it engages the valve seat 58. The control spring 68 is arranged in the blind bore 52 and between the control piston 42 and the inertia ball 66. An inlet port 72 is connected to the portion of the rear fluid pressure line 20 leading from the master cylinder 14 to communicate brake fluid and pressure generated in the master cylinder 14 to the inlet pressure chamber 41. An outlet port 74 is connected with the outlet chamber 64 and is connected to the portion of the rear fluid pressure line 20 which connects with the rear brakes 22. An air bleed valve 76 is connected with the end chamber 32 so that air may be bled from the end chamber.

A flow restricting orifice means 78 is provided in the inlet port 72 to restrict flow of hydraulic brake fluid passing through the port 72 so as to prevent the ball valve 66 from moving under the influence of brake fluid entering into the inlet pressure chamber 41. For the same purpose, the cross passages 56 are so arranged as not to direct brake fluid having past through it toward the ball valve 66.

A main spring 80 is received in the inlet chamber 41 about the control piston 42 with one end adjacent the large diameter piston section 44, and the other end engaging a shoulder 82 separating the bore 28 from the bore 30. An annular washer 84 is fixed to the valve body 26 to engage an annular face 86 of the large diameter piston section 44 to define the position of the control piston 42, as illustrated in FIG. 3.

The manner of operation of the device 24 and its functional relationship to the brake system as a whole will now be described. Upon the application of the brakes, brake fluid under pressure is delivered from the master cylinder 14 directly to the front brakes 18 through the front fluid pressure line 16. Brake fluid is also delivered to the inlet port 72 through the rear fluid pressure line 20 and then passes from the inlet port 72, through the inlet chamber 41, the cross passages 56, the end chamber 32, the passage 62, the outlet chamber 64 and the outlet port 74 to the rear brakes 22. Gravity maintains the ball 66 in the position shown in FIG. 3 so that it does not close off the passage 62. Therefore, fluid is at first freely communicated between the inlet port 72 and the outlet port 74. When, during brake application, vehicle deceleration reaches a predetermined magnitude, the inertia of the ball 66 will cause the ball 66 to roll leftwardly up the ramp formed by the side wall 70 until it engages the valve seat 58 and closes the passage 62. At this point there will no longer be free communication between the inlet port 72 and the outlet port 74, and any further increase in the inlet pressure generated in the master cylinder 14 after the changeover pressure will be prevented from being transmitted to the rear brakes 22.

The required magnitude of the vehicle deceleration at which the ball 66 seats against the valve seat 58 increases as the control piston 46 is urged to the right (viewing FIG. 3) in response to an increase in master cylinder pressure within the inlet pressure chamber 41 because the rightward movement of the control piston 46 will cause the control spring 68 to reduce its force urging the ball 66 in the closing direction toward the valve seat 58.

From the following equation, we obtain the required vehicle deceleration $a_o$ at which the ball 66 seats against the valve seat 58.

$$Ma_o \cos\theta + (K_2 - k_2 x) = (M - m) g \sin\theta$$

Therefore;

$$a_o = \frac{(M-m) g \sin\theta - (K_2 - k_2 x)}{M \cos\theta}$$

$$= \frac{M-m}{M} g \tan\theta - \frac{K_2}{M \cos\theta} + \frac{k_2}{M \cos\theta} x$$

where:
M = the weight of the ball 66
$K_2$ = the preload of the control spring 68
$k_2$ = the spring constant of the control spring 68
x = the displacement of the control piston 46 from its home position (the position illustrated in FIG. 3)
m = the weight of the brake fluid having a volume equal to the volume of the ball 66
g = the acceleration of gravity Substituting $M-m/M$ g tan $\theta - K_2/M$ cos $\theta$ and $k_2/M$ cos $\theta$ with constants $C_1$ and $C_2$, respectively, because they are constant, the above equation can be expressed as $$a_o = c_1 + c_2 x \tag{1}$$

An equation for relation between various forces acting on the differential piston 46 is as follows:

$$K_1 - k_1 X = \pi/4 d^2 P + (K_2 - k_2 X)$$

where:
d = the diameter of the piston rod 46 of the control piston 42
p = the master cylinder pressure
Since $(K_2 - k_2 X)$ is very small and thus negligible, therefore from the above equation we obtain $$X = \pi d^2/4 k_1 \cdot P - K_1/k_1$$

Substituting $\pi d^2/4 k_1$ and $K_1/k_1$ with constants $e_1$ and $e_2$, respectively, because they are constant, the above equation can be expressed as $$X = e_1 P - e_2$$

Substituting this equation into the equation (1)

$$a_o = c_1 + c_2(e_1 P - e_2)$$

$$a_o = c_1 - c_2 e_2 + c_2 e_1 P$$

Since the master cylinder pressure $P = a W a_o$ (where a is constant) this equation can be expressed as $$a_o = c_1 - c_2 e_2 + c_2 e_1 a W a_o$$

$$a_o = c_1 - c_2 e_2 / 1 - c_2 e_1 a W \qquad (2)$$

The equation (2) shows that the required magnitude of the vehicle deceleration $a_o$ at which the ball 66 seats against the valve seat 58 is a function of the vehicle weight W and increases quadratically with an increase of the vehicle weight W.

Figure 1:
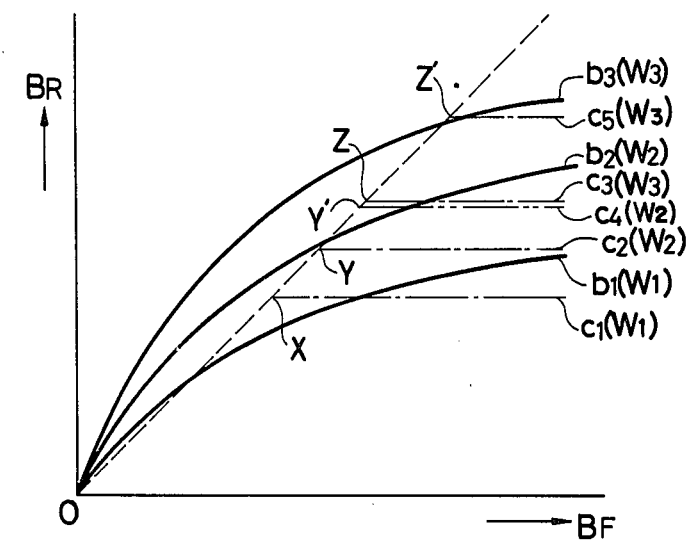
FIG. 1 is a graph showing an actual braking ratio, as a function of the vehicle weight, which is obtained by a vehicle brake system including the previously described known modulating valve which prevents the transmission of any further increase in master cylinder pressure after a changeover pressure to the rear brake cylinders, an ideal braking ratio, and an actual braking ratio which is obtained by a vehicle braking system illustrated in FIG. 3.

The actual braking ratio, obtained by the vehicle brake system illustrated in FIG. 3, as a function of the vehicle weight W is shown in FIG. 1.

In FIG. 1, $B_F$ denotes front brake pressure which is equal to master cylinder pressure, while $B_R$ rear brake pressure. Solid curves $b_1$, $b_2$ and $b_3$, represent ideal braking ratios for vehicle weights $W_1$, $W_2$ and $W_3$, respectively ($W_1 < W_2 < W_3$). Line $O-X-C_1$ represents an actual braking ratio for the vehicle weight $W_1$ which is obtained by the modulating valve 24 or the before described known modulating valve. Line $O-Y-C_2$ represents an actual braking ratio for the vehicle weight $W_2$ which is obtained by the known modulating valve and line $O-Z-C_3$ an actual braking ratio for the vehicle weight $W_3$ which is obtained by the same known modulating valve. It will be noted that as the vehicle weight increases the actual braking ratios obtained by the known modulating valve deviate considerably from the corresponding ideal braking ratios.

Line $O-Y'-C_4$ represents an actual braking ratio, obtained by the modulating valve 24, for the vehicle weight $W_2$ and line $O-Z'-C_5$ represents an actual braking ratio, obtained by the modulating valve 24, for the vehicle weight $W_3$. It will now be noted that the changeover pressure for the vehicle weight $W_2$ has increased to Y' and the changeover pressure for the vehicle weight $W_3$ to Z'.

Figure 4:
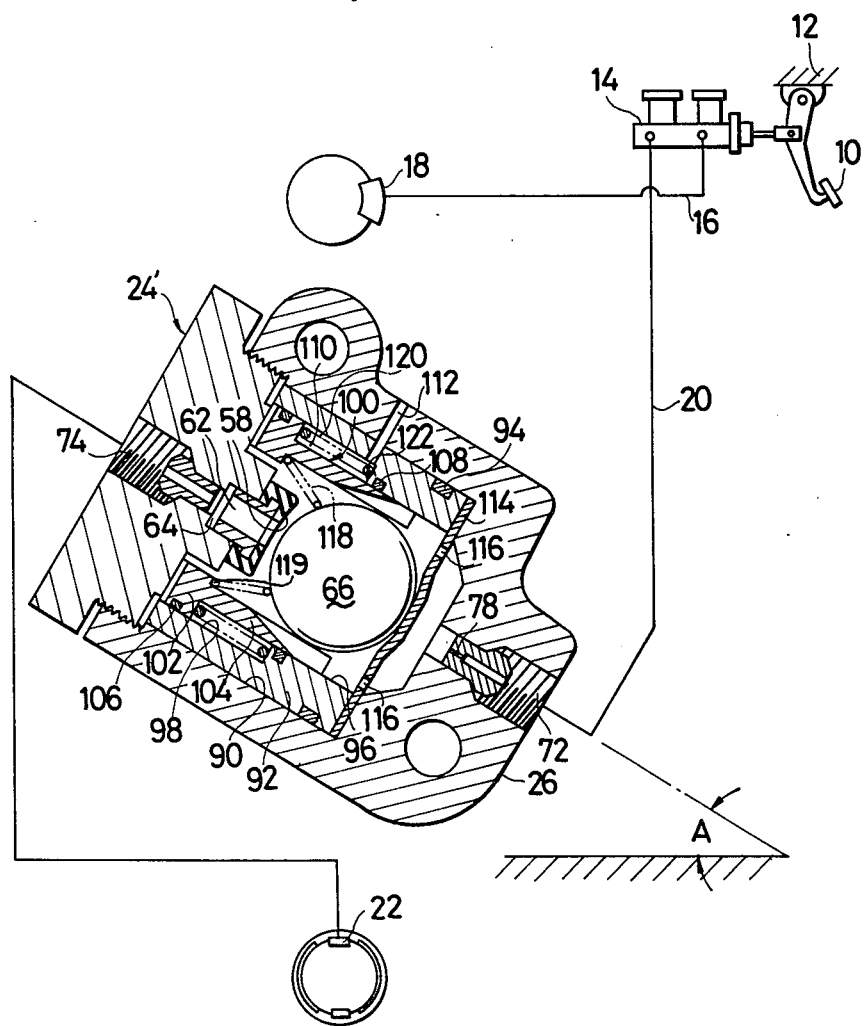
FIG. 4 is a schematic view of a vehicle brake system including a second embodiment of a modulating valve of the type similar to the valve shown in FIG. 3.

FIG. 4 illustrates a similar pressure modulating valve 24' to the valve 24 which, however, is more compact than the valve 24.

Referring to FIG. 4, a valve body 26 is provided with a bore 90 which receives therein a cylindrical member 92 with a seal 94 between the member 92 and the valve body 26. The cylindrical member 92 is formed with a large diameter bore 96 and a small diameter bore 98. A control piston 100 is mounted for slidable axial movement in the large diameter bore 98 and has a piston section 102 and an integral piston rod section 104. The piston rod section 104 extends into the small diameter bore 96. A seal 106 seals the piston section 102 and the wall of the large diameter bore 98 and another seal 108 seals the piston rod section 104 and the small diameter bore 96 so that an atmospheric pressure chamber 110 is formed between the control piston 100 and the cylindrical member 92. Denoted by 112 is an air bleed passage.

The control piston 100 is axially hollowed to slidably receive an inertia ball 66 which is capable of seating against a valve seat 58 to close a passage 62. Since the valve body 26 is normally mounted at an angle to the horizontal and pointing upwardly and forwardly of the vehicle, the ball 66 normally rests against a ball seat 114, which has a plurality of passages 116 extending therethrough, and is held spaced from the valve seat 58 by a control spring 118. The control spring 118 has one end engaging the ball 66 and other end engaging a shoulder 119 formed on the control piston 100 such that moving the control piston 100 rightwardly (viewing FIG. 4) will cause the control spring 118 to increase its force urging the ball valve 66 in the opening direction toward the ball seat 114 and away from the valve seat 58.

A main spring 120 is received in the atmospheric pressure chamber 110 about the piston rod section 104 of the control piston 100, with one end adjacent the piston section 102 and the other end engaging a shoulder 122 of the cylindrical member 92 formed between the small and large diameter bores 96 and 98.

The operation of the pressure modulating valve 24' is substantially similar to that of the pressure modulating valve 24.

Figure 5:
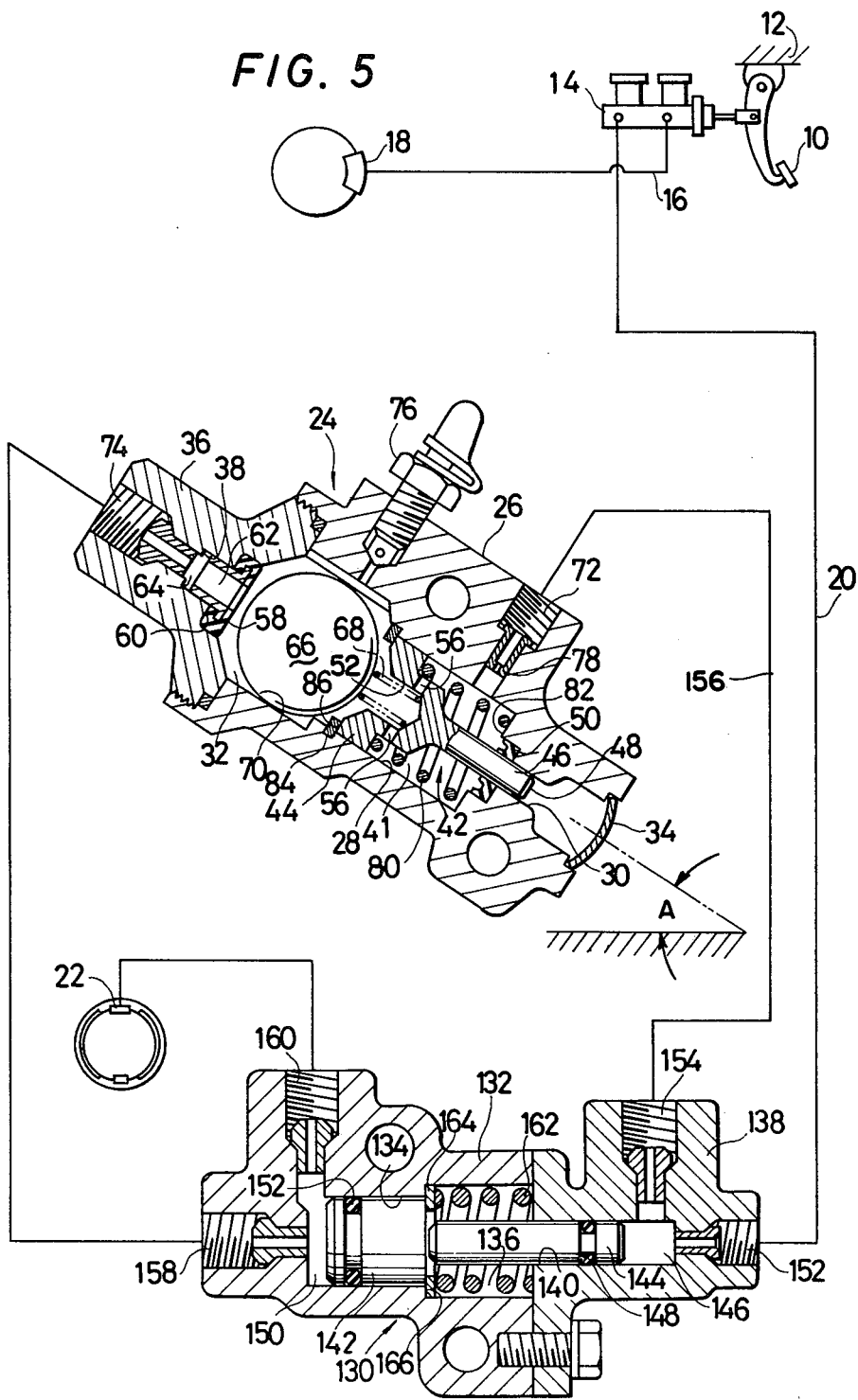
FIG. 5 is a schematic view of a vehicle brake system including the first embodiment of a modulating valve and a pressure reducing valve.

FIG. 5 illustrates a brake system in which in addition to a pressure modulating valve 24 shown in FIG. 3, a pressure reducing valve 130 is illustrated as installed.

The reducing valve 130 has a valve body 132 provided with a large diameter bore 134 and an end chamber 136 connected to one end of the larger diameter bore 134. The valve body 132 is closed by a headnut 138 which closes an open end of the end chamber 137. The headnut 138 is provided with a small diameter bore 140 which is arranged coaxially with the large diameter bore 134 and is open to the end chamber 136.

A large diameter piston 142 is mounted for slidable axial movement in the large diameter bore 134 and a small diameter piston 144 for slidable axial movement in the small diameter bore 140. The small diameter piston 144 has one end in abutting engagement with the large diameter piston 142 and its other end exposed to an inlet pressure chamber 146. A seal 148 seals the small diameter piston 144 and the headnut 138 so that pressure is retained within the inlet pressure chamber 146. The large diameter piston 142 has one end exposed to an outlet pressure chamber 150 and the other end in abutting engagement with the small diameter piston 144. A seal 152 seals the large diameter piston 142 and the body 132 so that pressure is retained in the outlet pressure chamber 150.

An inlet port 152 is connected to the portion of the rear fluid pressure line 20 leading from the master cylinder 14 to communicate brake fluid and pressure generated in the master cylinder 14 to the inlet pressure chamber 146. The inlet pressure chamber 146 communicates with the inlet pressure chamber 41 of the modulating valve 24 via an outlet port 154, a line 156 and the inlet port 72.

The valve body 132 is formed with an inlet port 158 and an outlet port 160. The inlet port 158 connects the outlet pressure chamber 64 of the modulating valve 24 with the outlet pressure chamber 150 of the reducing valve 130, and the outlet port connects the outlet pressure chamber 150 with the rear brake cylinders 22.

A positioning spring 162 is received in the end chamber 136 about the small diameter piston 144 with one end adjacent the large diameter piston 142 through a spring retainer 164 and the other end engaging the headnut 138. The valve retainer 164 is in abutting engagement with a shoulder 166 and the adjacent end of the large diameter piston 142 so that when the large diameter piston 142 is in the position as illustrated in FIG. 5, the large diameter piston 142 is not urged by the spring 162.

It is to be noted that both of the communication between the inlet pressure chamber 41 of the pressure modulating valve 24 and the master cylinder 14 and the communication between the outlet pressure chamber 64 of the pressure modulating valve 24 and the rear brakes 22 are not interrupted by the installation of the pressure reducing valve 130. This means that until the ball 66 seats against the valve seat 58 to isolate the rear brakes 22 from the master cylinder 14, the reducing valve 130 will not play any role in modulating the pressure in the rear brakes 22. Any further increase in master cylinder pressure beyond the changeover pressure, at which the ball 66 seats against the valve seat 58, will cause the large diameter piston 142 to apply pressure to the rear brakes 22. Therefore after the changeover pressure the rear brake pressure will increase at a reduced rate, as determined by the ratio between the piston area of the large diameter piston 142 and the piston area of the small diameter piston 144 and by the spring force of the spring 162, as the master cylinder pressure within the inlet pressure chamber 146 increases.

Figure 2:
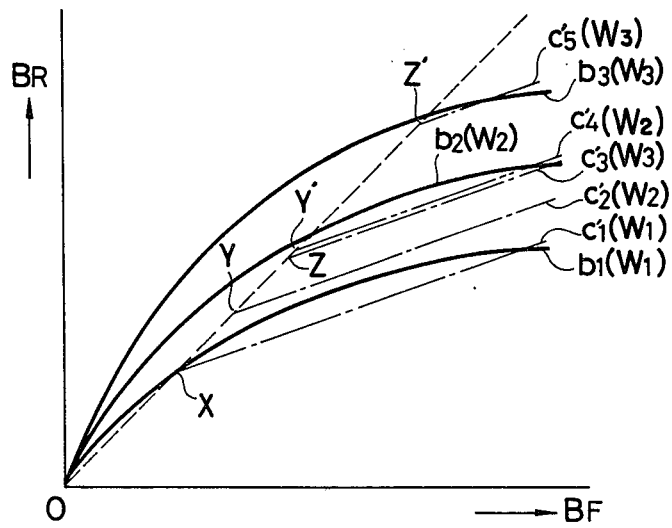
FIG. 2 is a graph showing an actual braking ratio, as a function of the vehicle weight, which is obtained by a vehicle brake system including the previously described known modulating valve which permits transmission to some extent of any further increase in master cylinder pressure after a changeover pressure to the rear brake cylinders, an ideal braking ratio, and an actual braking ratio which is obtained by a vehicle brake system illustrated in FIG. 5.

The actual braking ratio, obtained by the braking system illustrated in FIG. 5, as a function of the vehicle weight is shown in FIG. 2. In FIG. 2, solid curves $b_1$, $b_2$ and $b_3$ represent ideal braking ratios for vehicle weight $W_1$, $W_2$ and $W_3$, respectively ($W_1 < W_2 < W_3$).

Line O-X-$C_1'$ represents an actual braking ratio for the vehicle weight $W_1$ which is obtained by the modulating valve 24 in operative connection with the pressure reducing valve 130 or by the before described known modulating valve in operative connection with a pressure reducing valve similar to the valve 130. Line O-Y-$C_2'$ represents an actual braking ratio for the vehicle weight $W_2$ which is obtained by the known valves and line O-Z-$C_3'$ an actual braking ratio for the vehicle weight $W_3$.

Line O-Y'-$C_4'$ represents an actual braking ratio, obtained by the modulating valve 24 and the pressure reducing valve 130, for the vehicle weight $W_2$ and line O-Z'-$C_5'$ an actual braking ratio for the vehicle weight $W_3$.

Figure 6:
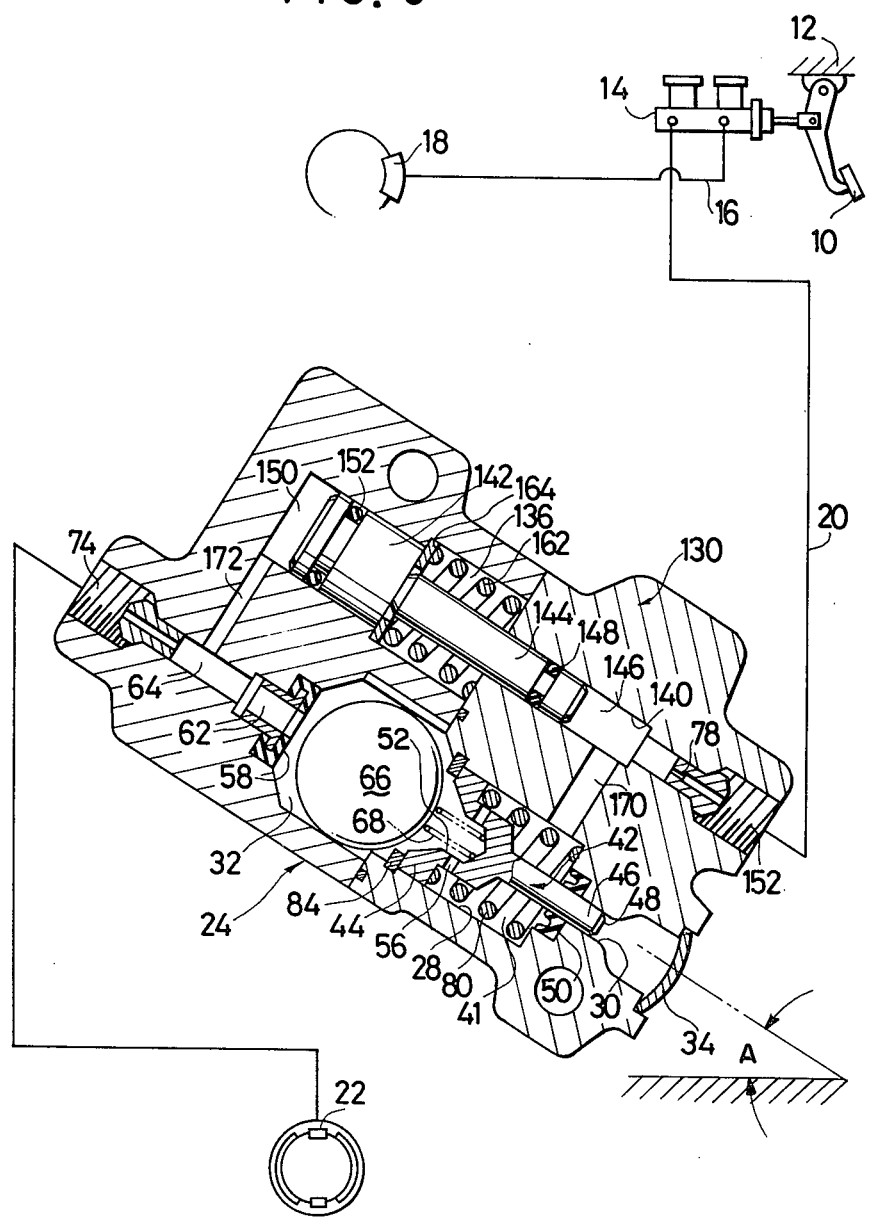
FIG. 6 is a schematic view of a similar vehicle braking system shown in FIG. 5 except that the pressure reducing valve is formed integrally with the modulating valve.

The pressure reducing the valve 130, although being separated from the pressure modulating valve 24 in the brake system shown in FIG. 5, can be incorporated into the latter as shown in FIG. 6.

In the embodiment shown in FIG. 6, a valve body is formed with a passage 170 connecting an inlet pressure chamber 146 of a pressure reducing valve 130 and an inlet pressure chamber 41 of a pressure modulating valve 24, and another passage 172 connecting outlet pressure chamber 150 of the valve 130 and an outlet pressure chamber 64 of the valve 24. It will be noted that the passage 170 has replaced the outlet port 154, the inlet port 72 and the line 156, which were used in the embodiment shown in FIG. 5, while the passage 172 the inlet port 158 and the outlet port 160 for line connection (see FIG. 5).

What is claimed is:

1. In a pressure modulating valve for a vehicle braking system including a master cylinder and a rear brake cylinder, comprising:

a valve body including a first chamber, a second chamber, an inlet port connected to said master cylinder and in communication with said first chamber, an outlet port connected to said rear brake cylinder and in communication with said chamber and a passage connecting said first and second chambers;

valve means for controlling fluid flow through said passage, said valve means comprising a stationary valve seat and an inertia valve member disposed in said first chamber normally permitting communication between said first and second chambers through said passage, but adapted to cooperate with said valve seat to cut off communication between said first and second chambers and to roll on an inclined surface in said first chamber;

a control piston;

a first spring having one end abutting said valve body and the other end abutting said control piston to bias said control piston in one direction; said control piston being movable in the opposite direction to said one direction against said first spring in response to pressure within said first chamber; the improvement comprising a second spring operatively disposed between said control piston and said inertia valve member; and said control piston and second spring being positioned, with respect to said inertia valve member and stationary valve seat, to prevent said inertia valve member from cooperating with said valve seat under the influence of the weight of said valve member and said second spring and the loading on said inertia valve member by said second spring varies in response to movement of said control piston.

2. A pressure modulating valve as claimed in claim 1, in which the loading on said inertia valve member by said second spring is in a direction towards said valve seat and decreases as said control piston is moved in said opposite direction against said first spring .

3. A pressure modulating valve as claimed in claim 2, in which said valve body includes a stepped bore having a larger diameter bore communicating with said first chamber and a smaller diameter bore communicating with the atmosphere, in which said control piston works in said stepped bore and has a larger diameter piston working in said larger diameter bore and connected with the pressure in said first chamber and has a smaller diameter piston rod working in said smaller diameter bore and connected with the atmosphere; and in which said first spring is disposed in said larger diameter bore to bias said control piston axially in a direction toward said larger diameter piston of said control piston.

4. A pressure modulating valve as claimed in claim 3, in which said larger diameter piston of said control piston has at least one passage to connect one side of said larger diameter piston within said larger diameter bore and the opposite side of said larger diameter piston within said larger diameter bore.

5. A pressure modulating valve as claimed in claim 2, in which said valve body includes a stepped bore having a larger diameter bore and a smaller diameter bore which form part of said first chamber, in which said control piston works in said stepped bore and has a larger diameter end working in said larger diameter bore and connected with the pressure within said first chamber and has a smaller diameter end working in said smaller diameter bore and connected with the pressure in said first chamber, said control piston being hollowed to receive said inertia valve member, and in which said first spring is disposed in said larger diameter bore to bias said control piston axially in a direction toward said larger diameter end of said control piston.

6. A pressure modulating valve as claimed in claim 5, in which a valve rest is disposed in said first chamber on which said inertia valve member rests.

7. A pressure modulating valve as claimed in claim 1, in which the loading on said inertia valve member by said second spring is in a direction away from said valve seat and increases as said control piston is moved in said opposite direction against said first spring.

8. A pressure modulating valve as claimed in claim 1, in which said inertia valve member comprises a ball.

9. A pressure modulating valve as claimed in claim 1, further comprising spool valve means responsive to the master cylinder pressure for proportionally increasing within a limited range the pressure in said rear brake cylinder.

10. A pressure modulating valve as claimed in claim 9, in which said spool valve means is disposed in said valve body.

* * * * *